United States Patent
Grosbard

[15] 3,639,817
[45] Feb. 1, 1972

[54] MAGNETIC ACCELERATOR

[72] Inventor: Gregory Grosbard, 353 West 19th Street, New York, N.Y. 10011

[22] Filed: Oct. 20, 1969

[21] Appl. No.: 867,602

Related U.S. Application Data

[63] Continuation-in-part of Ser. No. 558,465, June 17, 1966, Pat. No. 3,480,811.

[52] U.S. Cl. ............................318/16, 310/156, 325/14
[51] Int. Cl. ............................................................B64g 1/00
[58] Field of Search.................318/16, 147, 156, 325, 150; 310/156; 325/26, 66, 14, 492

[56] References Cited

UNITED STATES PATENTS

| | | | |
|---|---|---|---|
| 2,589,453 | 3/1952 | Storsand | 318/150 X |
| 2,741,731 | 4/1956 | Pestarini | 318/150 |
| 2,637,015 | 4/1953 | Franklin | 318/147 X |
| 2,786,132 | 3/1957 | Rines | 325/14 X |
| 3,006,239 | 10/1961 | Smolar | 318/325 X |
| 3,169,218 | 2/1965 | Reich | 318/16 |
| 3,214,690 | 10/1965 | Salisbury | 318/16 |
| 3,434,678 | 3/1969 | Brown et al. | 318/16 |
| 3,480,811 | 11/1969 | Grosbard | 310/156 |

Primary Examiner—L. T. Hix
Assistant Examiner—Robert J. Hickey
Attorney—Clarence A. O'Brien and Harvey B. Jacobson

[57] ABSTRACT

Energy is transferred by microwave radiation over long distances to an energy storage device in which the radiant energy is converted to electromagnetic pulses accelerating a rotor to increase its energy level. The kinetic energy level of the rotor, which is determined by its rotational speed, is sustained by radially directed, electromagnetically induced forces. Energy is withdrawn through coils toroidally surrounding the rotor within which current is generated by rotation of the rotor.

14 Claims, 7 Drawing Figures

Gregory Grosbard
INVENTOR.

PATENTED FEB 1 1972

Gregory Grosbard
INVENTOR.

BY Clarence A. O'Brien
and Harvey B. Jacobson
Attorneys

MAGNETIC ACCELERATOR

This application is a continuation-in-part of my prior copending application U.S. Ser. No. 558,465, filed June 17, 1966, now U.S. Pat. No. 3,480,811. The invention thus relates to the conversion and storage of energy by means of a rotating rotor.

In my prior copending application aforementioned, a basic method and apparatus is disclosed for storing energy by sustaining rotation of a rotor at a speed corresponding to a predetermined energy level. Thus, the level of energy stored increases or decreases as the speed of the rotor correspondingly increases or decreases. An important object of the present invention resides in the supply of energy to the converter from some remote source and more particularly to the transfer of energy from a remote location by radiation.

In accordance with the foregoing object, radiation in the form of microwaves is beamed to the energy-storing converter at which the radiation is converted to electromagnetic pulses arranged to accelerate the rotor to a higher energy level speed. Facilities are accordingly provided for varying the pulsation rate of the electromagnetic pulses as a proper function of the rotor speed. Also, magnetic biasing means is provided in order to insure a proper phase relationship between the rotor and any rotor accelerating pulses supplied.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
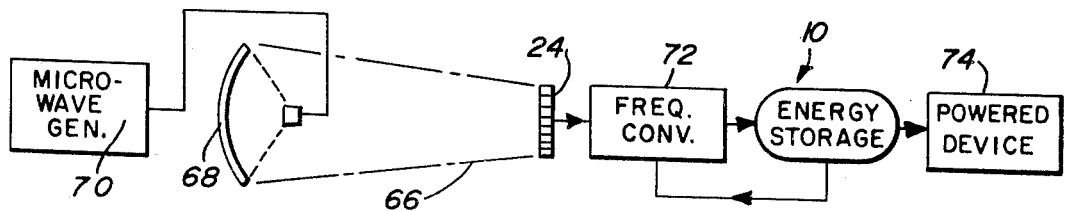
FIG. 1 is a diagrammatic illustration depicting the system of the present invention.

Referring now to the drawings in detail, FIGS. 1-5 illustrate a typical energy storage device constructed in accordance with the present invention which is generally denoted by reference numeral 10. The device 10 is generally toroidal in shape and is provided with a toroidal shell 12 within which an annular rotor is enclosed for rotation about a central axis of the toroidal shell. In addition to enclosing the annular rotor 14, the shell 12 also mounts solenoid coils 42 electrically terminating at a plurality of angularly spaced terminals connected in parallel to a pair of conductors 16 and 18 protectively enclosed within annular sheathing 20. Also fixedly mounted on the toroidal shell, is an electromagnetic winding 44.

The foregoing construction of the toroidal shell, the arrangement of the coils 42 in toroidal relationship to the annular rotor 14 and the envelope shape of the coil 44 exposing the radially outer portion of the toroidal shell, is the same as that described in my aforementioned prior copending application. Likewise, the functions of the various parts hereinbefore described are the same as that described in my prior copending application. The rotor construction is however somewhat different in that the outer walls 28 enclose a fluidtight chamber within which an ionized gas 26 is retained. Also, a pair of permanent magnets 34 are fixedly positioned within the chamber of the hollow rotor 14 with the opposite pole faces 38 and 40 equally spaced from each other so as to angularly divide the rotor into four segments. Thus, the same number of coils 42 toroidally encircle the rotor so that an alternating voltage will appear across the conductors 16 and 18 in response to rotation of the rotor about the central axis of the toroidal shell. The rotor is suspended within the toroidal shell 12 by any suitable means minimizing frictional resistance to rotation as discussed in my aforementioned prior copending application.

As explained in my aforementioned prior copending application, the shape of the coil 44 is arranged to concentrate the flux lines of its magnetic field in intersecting relation to the body of the rotor 14 with a minimum amount of magnetic energy loss. As the rotor moves through this magnetic field, cutting its lines of flux, internal circulating current is induced therein and conducted through the ionized gas resulting in the generation of an accelerating force in a radially inward direction mutually perpendicular to the flux lines from the coil 44 and the current flow direction at any location on the rotor. The magnitude of the radially directed forces will depend upon the flux density or the strength of the magnetic field as is well known, which in turn depends upon the current conducted through coil 44. Therefore, by appropriately regulating the DC current through coil 44, rotation of the rotor may be sustained at any desired speed. Further, the magnetic field associated with coil 44 intersects the magnetic field associated with coils 42 at right angles within the rotor so as to cooperate in a noninterfering manner.

Figure 6:
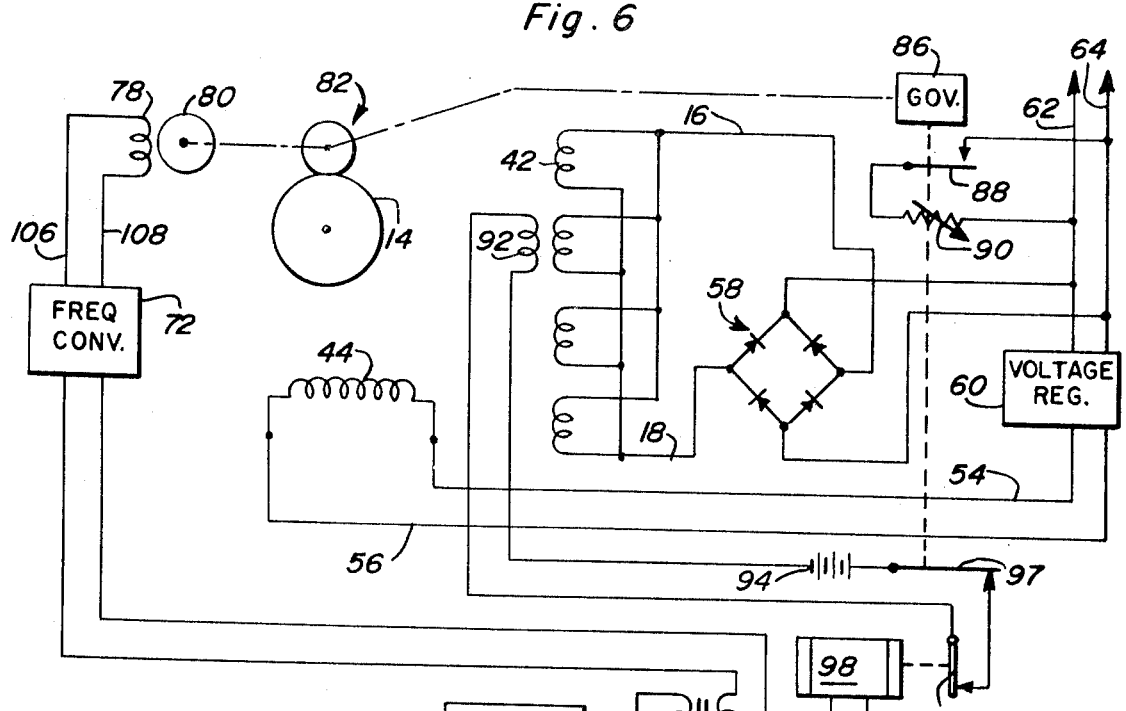
FIG. 6 is an electrical circuit diagram associated with the energy storage device.
Figure 5:
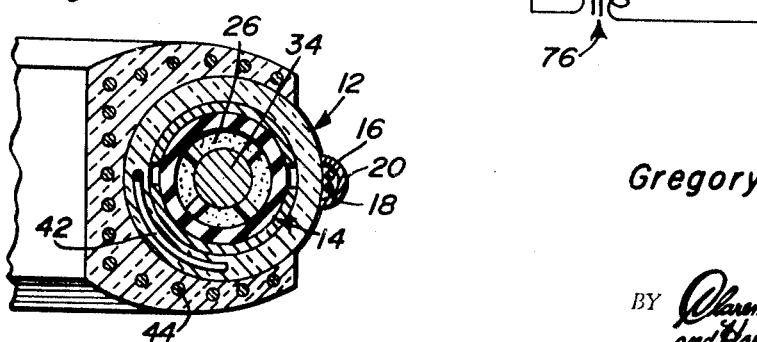
FIG. 5 is a partial sectional view taken substantially through a plane indicated by section line 5—5 in FIG. 4.
Figure 2:
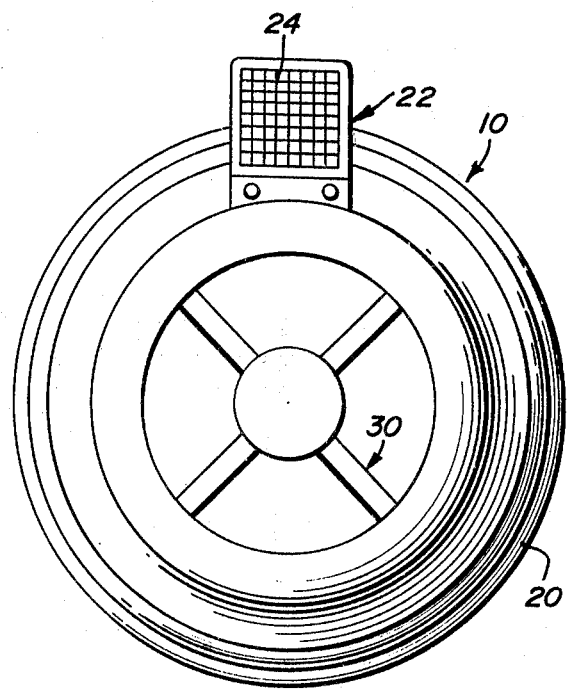
FIG. 2 is a front elevational view illustrating one embodiment of an energy storage device constructed in accordance with the present invention.
Figure 3:
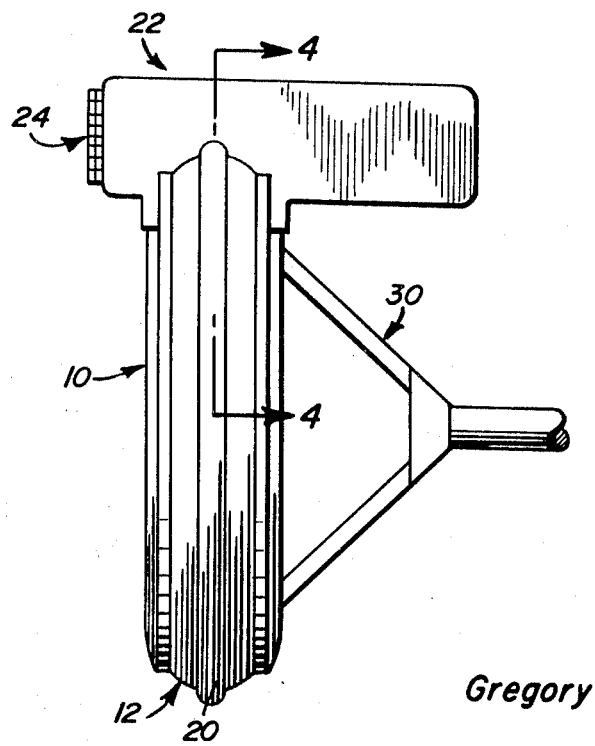
FIG. 3 is a side elevational view of the device shown in FIG. 2.
Figure 4:
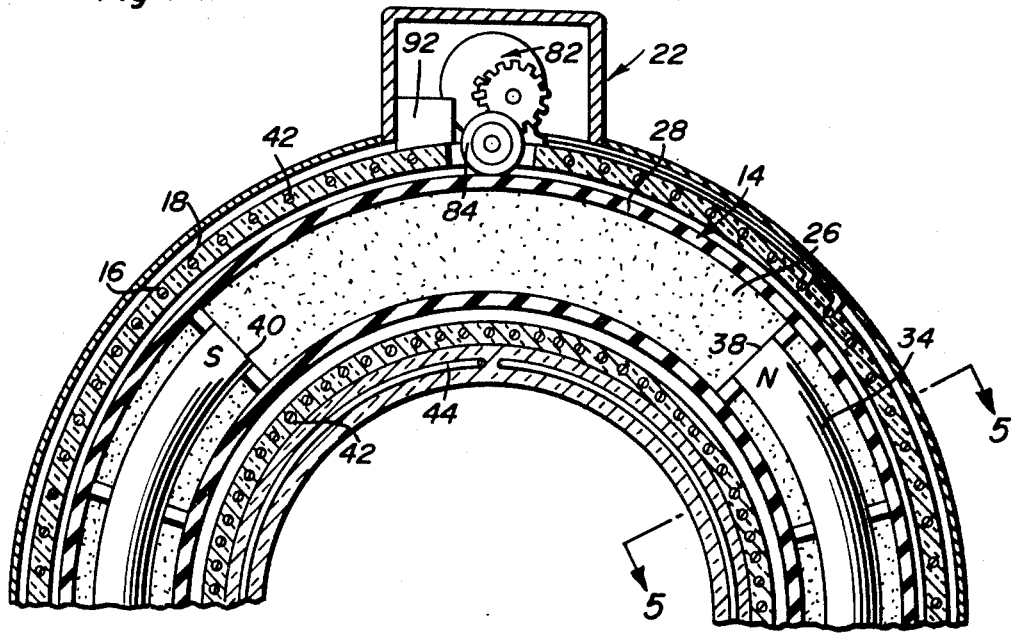
FIG. 4 is an enlarged partial sectional view taken substantially through a plane indicated by section line 4—4 in FIG. 3.

As also explained in my aforementioned prior copending application, once movement has been imparted to the rotor at a certain speed, it continues at this speed (disregarding mechanical and electrical losses) because of the radially inward force developed by the magnetic field of the coil 44 sustaining rotation of the rotor at this speed. The AC output from coils 42 is transformed by a rectifier 58 as shown in FIG. 6 and supplied through regulator 60 as a DC voltage to coil 44 for this purpose. Withdrawal of electrical energy from the system due to energy losses or by some load connected to the output lines 62 and 64 will of course be occasioned by a decrease in speed of the rotor to a value corresponding to a lower level of energy stored in the system. Therefore, in accordance with the present invention, energy is introduced to the system from an external source. Toward this end, the toroidal shell 12 fixedly mounts a housing 22 as shown in FIGS. 2, 3 and 4 supporting facilities for receiving radiant energy and converting it into electromagnetic pulses for accelerating the rotor 14 in order to raise the level of energy stored within the device 10. The housing 22 mounts at its forward end, a radiant energy receiving array 24. The device 10 may be supported in proper position for reception of radiant energy by any suitable means such as the spider frame 30 on a vehicle or station located a substantial distance from the location at which the radiant energy is generated.

Referring to FIG. 1, it will be observed that in one form of the invention the radiant energy receiving array 24 is orientated to receive a microwave radiation beam 66 from a focusing antenna 68 to which radiation energy is supplied from a microwave generator 70. Transmission of energy in this manner between remote locations is already known as disclosed for example in U.S. Pat. No. 3,434,678 to Brown et al.

With continued reference to FIG. 1, the energy transmitted to the receiver 24 before being supplied to the energy storage device 10, in order to raise its energy level, is properly processed by a frequency converter component 72. Thus, small amounts of energy beamed to the station at which the energy storage device is located, will be stored so that over a relatively long period of time, a substantial amount of energy may be accumulated. A source of energy will therefore be available for operating any powered device 74. It will therefore be appreciated that the system of the present invention will be particularly useful for beaming useful energy over very long distances to operate equipment associated with artificial satellites or space vehicles by way of example.

In accordance with the present invention, the radiant energy picked up by the microwave receiver 24 will produce a pulsating DC voltage that must be converted into electromagnetic pulses of proper frequency in order to accelerate the rotor 14 to a higher speed. Toward this end, the output of the microwave receiver 24 is fed through a transformer 76 to the frequency converter 72 from which an accelerating coil 78 is pulsed at a proper frequency to apply torque through an armature 80 and gearing 82 to the rotor 14. As to the details of the motor formed by coil 78 and armature 80, which form no part of the present invention, reference may be had to the disclosure in U.S. Pat. No. 3,169,218. As shown in FIG. 4, the gearing 82 is enclosed within the housing 22 to drivingly interconnect the armature 80 with the rotor 14 and includes a driven gear element 84 in meshing engagement with the outer rim of the rotor 14. Any suitable gear arrangement well known to persons skilled in the art may be used for this purpose, the details of which form no part of the present invention. A suitable drive ratio is selected for the gearing so as to impose very little loading on the rotor 14 when no accelerating pulses are being applied to the armature 80. The gearing 82 as shown in FIG. 6, is also drivingly connected to a governor device 86 rendered operative at a predetermined upper speed limit of the rotor 14 to close a switch 88 connecting an adjustable load 90 across the powerline 62 and 64 in order to load the system and thereby maintain the speed of the rotor 14 below the upper speed limit. Speed governors for this purpose are well known to persons skilled in the art; see for example U.S. Pat. No. 3,286,057. The upper speed limit is of course selected in accordance with the strength of materials and energy storage capacity of the device 10.

It will be appreciated, that whenever an accelerating signal is received, the accelerating pulses to be effective on the rotor 14 must be in proper phase relation to the magnets 34. Accordingly, the rotor is normally biased to the proper aligned position for being accelerated by the accelerating pulses by means of a magnetic biasing coil device 92 as shown in FIGS. 4 and 6. Energy for energizing the coil 92 is supplied by a battery 94 when the rotor 14 drops below a minimum speed through a normally closed relay switch 96 and a governor controlled switch 97. When an accelerating signal is received from the transformer 76, the relay coil 98 is energized to open the relay switch 96 and remove the magnetic bias. Thus, the coil 92 prevents the rotor 14 from assuming a "dead center" position.

Figure 7:
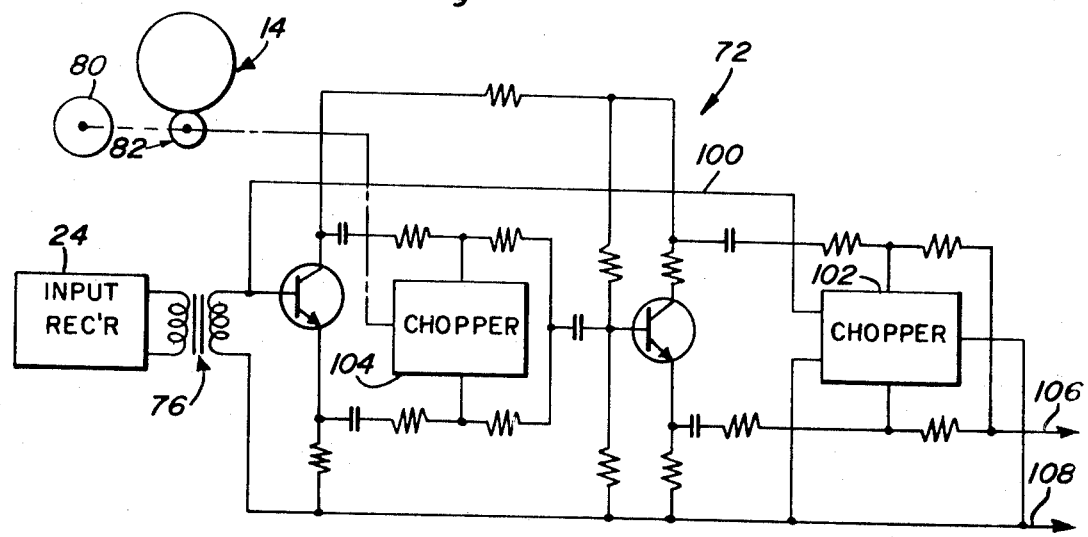
FIG. 7 is an electrical circuit diagram illustrating one of the components shown in FIG. 6.

The feasibility of imparting drive to a rotor by electrical energy derived from a radiant energy receiver, is already established in U.S. Pat. No. 3,169,218 to Reich, aforementioned, disclosing this concept. While drive is imparted to the rotor at a preset speed in Reich by use of a fixed operational frequency, the speed of the rotor in the present invention is increased by varying the frequency of the input energy to motor 78-80 utilizing the frequency converter 72 for this purpose. With respect to the frequency converter 72, FIG. 7 illustrates one exemplary form that may be suitable for the purposes. This type of frequency converter is disclosed in U.S. Pat. No. 3,249,845 to Gustafson et al. It will be noted, that the input signal to the frequency converter 72 obtained from the output of transformer 76, is connected by conductor 100 to the chopper 102 so as to operate it at the frequency of the input signal in accordance with the disclosure in U.S. Pat. No. 3,249,845 whereas the chopper 104 so that it may operate at the desired output frequency. Thus, pulsating energy at the proper frequency is supplied by the output lines 106 and 108 to the accelerating coil 78 as hereinbefore described in connection with FIG. 6. It will of course be appreciated, that other frequency converters may be utilized in order to perform the synchronizing function involving the conversion of a fixed input frequency of the microwave receiver 24 to a varying output frequency corresponding to the increasing speed of the rotor 14 as the energy level of the storage device 10 is increased.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with an energy-storing device having an annular rotor, electromagnetic means for maintaining the rotor rotating at a speed corresponding to a predetermined energy storage level and magnetic coupling means responsive to rotation of the rotor for supplying electrical energy to the electromagnetic means to regulate said speed of the rotor, means for accelerating the rotor to a higher energy storage level including means for receiving radiant energy from a remote source, and converter means connected to the receiving means for converting the radiant energy into electromechanical accelerating pulses applied to the rotor.

2. The combination of claim 1 including synchronizing means for varying the rate at which said pulses are applied to the rotor as a function of rotor speed.

3. The combination of claim 2 including magnetic biasing means operatively aligning the rotor for acceleration by said pulses.

4. The combination of claim 3 including means for loading the magnetic coupling means in response to acceleration of the rotor to a predetermined limit speed.

5. The combination of claim 4 wherein said rotor is hollow and encloses an ionized gas therein.

6. The combination of claim 1 including magnetic biasing means operatively aligning the rotor for acceleration by said pulses.

7. The combination of claim 1 including means for loading the magnetic coupling means in response to acceleration of the rotor to a predetermined limit speed.

8. The combination of claim 1 wherein said rotor is hollow and encloses an ionized gas therein.

9. The combination of claim 1 wherein said radiant energy is microwave radiation.

10. In combination with an energy-storing device having a rotor, electromagnetic means for maintaining the rotor rotating at a speed corresponding to a predetermined energy storage level and magnetic coupling means responsive to rotation of the rotor for supplying electrical energy to the electromagnetic means to regulate said speed of the rotor, means for accelerating the rotor to a higher energy storage level including means for receiving microwave radiation from a remote source, and converter means connected to the receiving means for converting the radiant energy into electromechanical accelerating pulses applied to the rotor.

11. An energy-storing device comprising, an annular rotor, electromagnetic means for maintaining the rotor rotating at a speed corresponding to a predetermined energy storage level, coil means mounted in toroidal relationship to the rotor for conducting current induced by rotation of the rotor, and current-regulating means connecting the coil means to the electromagnetic means for rendering the electromagnetic means operative, said rotor being hollow to form a fluidtight chamber filled with an ionized gas.

12. The combination of claim 11 including angularly spaced magnets fixedly positioned internally within the chamber of the rotor.

13. The combination of claim 12 including a housing enclosing the rotor, and means mounted on the housing for accelerating the rotor, to a higher energy level in response to energy radiated from a remote source.

14. The combination of claim 11 including a housing enclosing the rotor, and means mounted on the housing for accelerating the rotor to a higher energy level in response to energy radiated from a remote source.

* * * * *